United States Patent
Cornic et al.

(10) Patent No.: US 10,620,305 B2
(45) Date of Patent: Apr. 14, 2020

(54) MULTIBEAM FMCW RADAR, IN PARTICULAR FOR AUTOMOBILE

(71) Applicant: THALES, Courbevoie (FR)

(72) Inventors: Pascal Cornic, Guilers (FR); Stéphane Kemkemian, Paris (FR); Yves Audic, Plouzane (FR)

(73) Assignee: THALES, Courbevoie (FR)

( * ) Notice: Subject to any disclaimer, the term of this patent is extended or adjusted under 35 U.S.C. 154(b) by 344 days.

(21) Appl. No.: 15/792,700

(22) Filed: Oct. 24, 2017

(65) Prior Publication Data

US 2018/0120427 A1    May 3, 2018

(30) Foreign Application Priority Data

Oct. 27, 2016    (FR) ..................................... 16 01552

(51) Int. Cl.
 *G01S 5/02*    (2010.01)
 *G01S 13/34*    (2006.01)
 (Continued)

(52) U.S. Cl.
 CPC ............ *G01S 13/34* (2013.01); *G01S 7/4021* (2013.01); *G01S 7/4056* (2013.01);
 (Continued)

(58) Field of Classification Search
 CPC .... G01S 13/34; G01S 13/343; G01S 13/4463; G01S 13/931; G01S 7/4021; G01S 7/4056
 (Continued)

(56) References Cited

U.S. PATENT DOCUMENTS

2002/0107629 A1 * 8/2002 Maruko ............. B60K 31/0008
                                                                 701/93
2010/0088655 A1 * 4/2010 Luo ..................... G06F 17/5081
                                                                 716/136
(Continued)

FOREIGN PATENT DOCUMENTS

CN    102866387 B  *  6/2014
EP    1 533 866 A1    5/2005
(Continued)

OTHER PUBLICATIONS

Rocca et al., "Low sidelobe ADS-based arrays for FMCW radar," 2011 IEEE International Symposium on Antennas and Propagation (APSURSI), Jul. 3, 2011, pp. 2004-2007, XP032191607.
(Continued)

*Primary Examiner* — Harry K Liu
(74) *Attorney, Agent, or Firm* — Baker & Hostetler LLP

(57) ABSTRACT

A radar comprises at least one array antenna composed of transmit sub-arrays and of receive sub-arrays, a transmit and receive system and processing means: the distribution of the transmit sub-arrays and receive sub-arrays is symmetric both with respect to a vertical axis and a horizontal axis; at least two transmit sub-arrays symmetric with respect to the vertical axis are the largest possible distance apart; at least two transmit sub-arrays symmetric with respect to the horizontal axis are the largest possible distance apart; at least two receive sub-arrays symmetric with respect to the vertical axis are the largest possible distance apart; at least two receive sub-arrays symmetric with respect to the horizontal axis are the largest possible distance apart; a first coding of the wave transmitted by the transmit sub-arrays carried out by frequency shifting of the ramps between the various transmit sub-arrays; a second coding of the wave transmitted by the transmit sub-arrays carried out by phase modulation
(Continued)

from frequency ramp to frequency ramp between the various transmit sub-arrays.

20 Claims, 11 Drawing Sheets

(51) Int. Cl.
*G01S 13/931* (2020.01)
*G01S 13/44* (2006.01)
*G01S 7/40* (2006.01)
*H01Q 1/32* (2006.01)
*G01S 13/02* (2006.01)

(52) U.S. Cl.
CPC ........ *G01S 13/343* (2013.01); *G01S 13/4463* (2013.01); *G01S 13/931* (2013.01); *H01Q 1/3233* (2013.01); *G01S 2013/0245* (2013.01); *G01S 2013/93271* (2020.01)

(58) Field of Classification Search
USPC ........................................................ 342/378
See application file for complete search history.

(56) References Cited

U.S. PATENT DOCUMENTS

| | | | |
|---|---|---|---|
| 2015/0061928 A1 | 3/2015 | Comic et al. | |
| 2015/0285898 A1* | 10/2015 | Testar | G01S 7/02 342/118 |
| 2016/0033632 A1* | 2/2016 | Searcy | G01S 7/03 342/153 |
| 2017/0254879 A1* | 9/2017 | Tokieda, I | G01S 13/343 |

FOREIGN PATENT DOCUMENTS

| | | |
|---|---|---|
| EP | 2 312 335 A1 | 4/2011 |
| FR | 2 987 683 A1 | 9/2013 |

OTHER PUBLICATIONS

I. Slomian et al., "Multi-beam and multi-range antenna array for 24 GHz radar applications," 2014 20th International Conference on Microwaves, Radar and Wireless Communications, Jun. 16, 2014, pp. 1-4, XP032643583.
M. Schneider, "Automotive Radar—Status and Trends," Proceedings of the GeMiC 2005, Apr. 5, 2005, pp. 144-147, XP055229145.
M. Steinhauer et al., "Millimeter-Wave-Radar Sensor Based on a Transceiver Array for Automotive Applications," IEEE Transactions on Microwave Theory and Techniques, vol. 56, No. 2, Feb. 1, 2008, pp. 261-269, XP011200080.

\* cited by examiner

MULTIBEAM FMCW RADAR, IN PARTICULAR FOR AUTOMOBILE

CROSS-REFERENCE TO RELATED APPLICATION

This application claims priority to foreign French patent application No. FR 1601552, filed on Oct. 27, 2016, the disclosures of which are incorporated by reference in their entirety.

FIELD OF THE INVENTION

The present invention relates to a multibeam FMCW radar. It applies in particular in the field of radars for automotive vehicles. More generally it can apply to so-called FMCW frequency-modulated continuous-wave radars.

BACKGROUND

Radars for automobiles have been introduced for driving-aid functions, geared rather more towards comfort, such as for example the adaptation to cruising speed for motorway use, termed the ACC (Adaptative Cruise Control) function, or "Stop and Go" in urban driving. They use millimetric waves, in particular the 76-81 GHz band.

By virtue of evolving technologies, current applications are also aimed at safety functions of anticollision type, and it is even envisaged that the fully autonomous vehicle will be with us in the relatively short term, perception of the environment being ensured by the association of a certain number of sensors, relying on various technologies: radar, video, infrared in particular.

On account of its all-weather capabilities, the radar remains within this framework a predominant sensor and its detection and discrimination capabilities must be extended to guarantee overall reliability of the system. As far as anticollision is concerned, the radar sensor must in particular be capable of distinguishing, among the fixed objects that it detects, those which correspond to roadway infrastructure elements, from those which correspond to stationary vehicles in the way which potentially constitute a risk of collision. In this context, it is in particular fundamental that it does not generate false alarms that might give rise to braking or to an emergency avoidance manoeuvre, without real cause, in particular when the vehicle is moving at high speed. This demands increased sensitivity and discrimination capabilities making it possible to appraise the situation a large distance ahead of the vehicle, typically greater than 200 m. It may also be necessary to detect the edges of roads.

In this context, the detection sensitivity and also the angular resolution and angular location capability in the horizontal plane and in the vertical plane must be optimized simultaneously, whilst the dimensions of the antenna are particularly constrained.

A technical problem to be solved is in particular to obtain sufficient sensitivity and angular discrimination capabilities, while preserving a simple antenna architecture and while limiting the volume of processing.

To date, this problem has not been solved. From a purely technical point of view, an ideal solution would consist, for a constrained antenna surface area, in disposing radiating elements or sub-arrays of radiating elements over the whole of the available surface area, these radiating elements or sub-arrays being fed in an individual manner by active transmit and receive modules. This solution would make it possible to optimize the radiation patterns with respect to angular resolution, while controlling the level of the sidelobes of these patterns in transmission and in reception simultaneously. Unfortunately, for technology and cost reasons, it is not accessible within the framework of a millimetric wave application intended for automobiles in particular.

This is why simpler and less efficacious solutions are currently implemented.

Radars use array antennas optionally comprising several transmit channels and several receive channels, and carry out by numerical computation the formation of several beams in reception. In this case, transmission is performed on one or more antenna arrays producing a relatively wide beam, typically of more than 20° in the horizontal plane and 10° in the vertical plane, and reception is performed simultaneously or sequentially on several sub-arrays covering this same angular domain.

This technique makes it possible to locate the various targets in the horizontal plane, or indeed in the horizontal plane and in the vertical plane, by comparing the signals received on the various beams.

In certain cases, different sub-arrays of antennas are switched over time in transmit mode and in receive mode so as to generate a diversity of radiation pattern with the objective of measuring the azimuth and the elevation of the targets or of increasing the angular resolution. Such a principle is described for example in FIG. 3 or FIG. 4 of the publication "Automotive Radar—Status and Trends" by Martin Schneider (Proceeding the German Microwave Conference GeM IC 2005). This switching is performed to the detriment of the efficiency of the waveform of the radar, which is then divided by the number of switchings. Moreover, the presence of switches in the microwave frequency chain gives rise to losses which degrade the sensitivity of the radar, and makes it necessary to increase the reception frequency band of the radar, this also being of such a nature as to degrade the sensitivity by increasing the noise power picked up by the receiver.

In other cases, transmission is performed by a transmit antennal sub-array and reception is performed simultaneously on several other receive antennal sub-arrays. This solution makes it necessary to distribute the reference oscillator at 76 GHz over the whole set of receive channels so as to perform the synchronous demodulation of the received signals, this being conceivable only on a small number of channels, having regard to the technological difficulties. Such a principle is described for example in FIG. 5 of the aforementioned publication "Automotive Radar—Status and Trends" by Martin Schneider. The complexity is further increased when beamforming must be performed in azimuth and in elevation.

In certain cases, the same sub-arrays are used simultaneously in transmission and in reception, such as for example described in the article "Millimeter-wave Radar Sensor Based on a Tranceiver Array for Automotive Applications" by Matthias Steinhauer et al., IEEE Transactions on Microwaves Theory and Techniques (vol. 56, Issue 2, February 2008). In such a solution the transmit receive coupling is very significant, and the sensitivity of the radar is strongly degraded by the leakage of the noise carried by the transmission in the various receivers. Moreover, if several transmit sub-arrays are activated simultaneously, it is necessary to transmit orthogonal waves on these various sub-arrays, this being rapidly complex if the number of channels is significant. In the same manner in reception, in order for the processing to remain simple and robust, it is necessary that, for a given sub-array, only the signal transmitted by this same sub-array be processed. The overall range budget is thus strongly degraded.

SUMMARY OF THE INVENTION

An aim of the invention is in particular to alleviate the aforementioned drawbacks and to make it possible to obtain sufficient sensitivity and angular discrimination capabilities, while preserving a simple antenna architecture and while limiting the volume of processing. For this purpose, the subject of the invention is a frequency-ramp-based frequency-modulation continuous-wave radar, termed FMCW, comprising at least one array antenna composed of transmit sub-arrays and of receive sub-arrays, a transmit and receive system and processing means, in which:

- the distribution of the transmit sub-arrays and of the receive sub-arrays is symmetric both with respect to a vertical axis and with respect to a horizontal axis;
- at least two transmit sub-arrays symmetric with respect to the said vertical axis are the largest possible distance apart;
- at least two transmit sub-arrays symmetric with respect to the said horizontal axis are the largest possible distance apart;
- at least two receive sub-arrays symmetric with respect to the said vertical axis are the largest possible distance apart,
- at least two receive sub-arrays symmetric with respect to the said horizontal axis are the largest possible distance apart;
- a first coding of the wave transmitted by the said transmit sub-arrays being carried out by frequency shifting of the said ramps between the various transmit sub-arrays;
- a second coding of the wave transmitted by the said transmit sub-arrays being carried out by phase modulation from frequency ramp to frequency ramp between the various transmit sub-arrays.

In one possible embodiment, in the said first coding, a first half of the transmit sub-arrays is fed by a first FMCW waveform and the second half is fed by the same waveform shifted in frequency, the two halves being symmetric with respect to the said vertical axis.

In another possible embodiment, in the said first coding, a first left half of the transmit sub-arrays is fed by a first FMCW waveform and the second left half is fed by the same waveform shifted in frequency, the said two halves being symmetric with respect to the intersection of the said vertical axis and of the said horizontal axis.

In the said second coding, the waves feeding the various transmit sub-arrays belonging to one and the same row, along the horizontal axis, are for example coded by the same phase code.

In another possible embodiment, in the said first coding, a first half of the transmit sub-arrays is fed by a first FMCW waveform and the second half is fed by the same waveform shifted in frequency, the two halves being symmetric with respect to the said horizontal axis.

In the said second coding, the waves feeding the various transmit sub-arrays belonging to one and the same column, along the vertical axis, are for example coded by the same phase code.

The said transmit and receive system comprises for example a first waveform generator $VCO_A$ generating a first FMCW waveform and a second waveform generator $VCO_B$, synchronous and coherent with the first, generating the other FMCW waveform shifted in frequency. Each of the said waveform generators $VCO_A$, $VCO_B$ is for example used both for transmission and for synchronous demodulation of the signals in reception. The frequency discrepancy between the said waveform generators is for example chosen so that the beat frequencies of the signals in reception demodulated by one and the same waveform generator $VCO_A$ occupy disjoint frequency bands depending on whether the said signals in reception originate from a transmission arising from the said same generator $VCO_A$ or from the other generator $VCO_B$.

The signals in reception resulting from the various transmit sub-arrays are for example separated by filtering and by correlation in reception, respectively according to their frequency band and according to their phase modulation code.

A first two-plane monopulse beamforming comprising a sum channel and two receive channels is for example performed in transmission by the said processing means, on each receive channel associated with a receive sub-array, by using the signals originating from all or some of the transmit sub-arrays. A second two-plane monopulse beamforming comprising a sum channel and two difference channels is for example performed in reception by the said processing means, by associating all or some of the signals received on all or some of the receive channels. The detection and the angular location of targets are for example performed on the basis of the signals resulting from the product of the transmit monopulse beams and of the receive monopulse beams.

The phase modulation code applied is for example a two-phase code having the value 0 or $\pi$.

The phase modulation code applied is for example a Hadamard code.

In a particular embodiment, the said antenna comprises six transmit sub-arrays and eight receive sub-arrays, the said transmit and receive system comprising two integrated circuits each comprising a generator of the waveform, three transmit channels and four receive channels, the three transmit sub-arrays disposed on one side of one of the said axes being fed by the transmit channels of one and the same integrated circuit, the other three sub-arrays being fed by the transmit channels of the other integrated circuit.

The said radar operates for example in millimetric waves, it is for example able to equip an automotive vehicle.

BRIEF DESCRIPTION OF THE DRAWINGS

Other characteristics and advantages of the invention will become apparent with the aid of the description which follows, offered in relation to appended drawings which represent.

DETAILED DESCRIPTION

Figure 1:
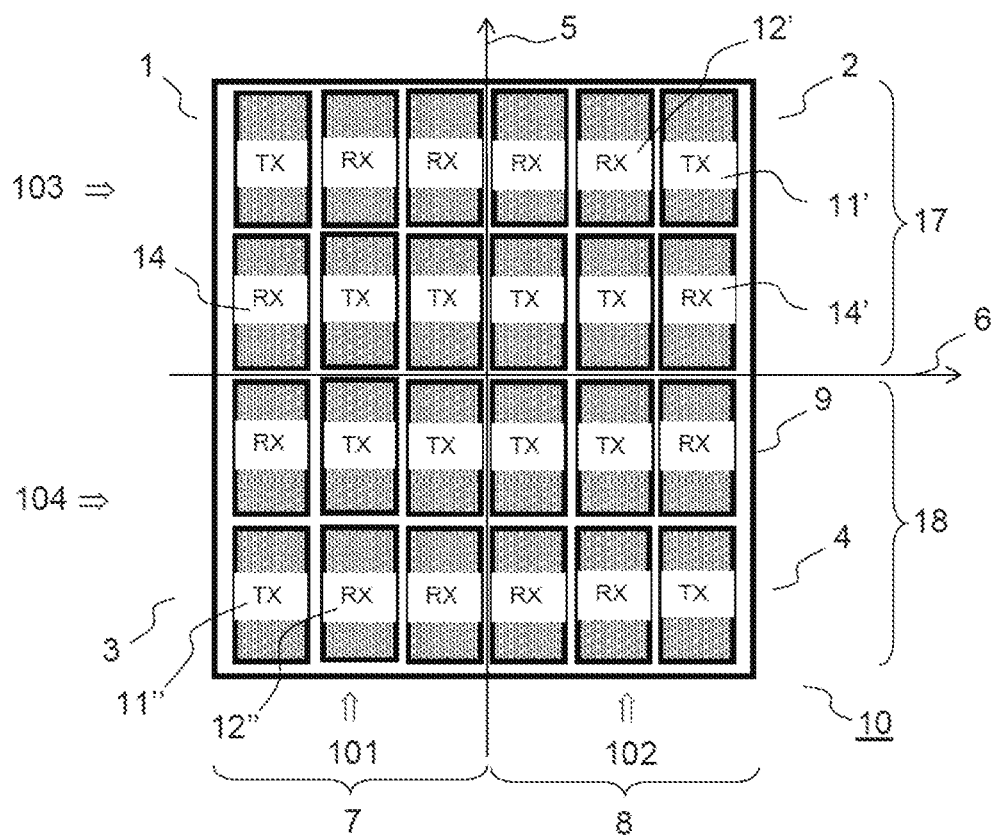
FIG. 1, an illustration of the principle of embodiment of an array antenna used in a radar according to the invention.

FIG. 1 illustrates the principle of embodiment of an array antenna used in a radar according to the invention.

In a radar according to the invention, adjacent antenna sub-arrays operating exclusively in transmission 11 or in reception 11 are disposed over the whole of the surface area of the antenna 1 available, so as to carry out a two-plane monopulse beamforming in transmission and in reception by dividing the antenna into four quadrants 1, 2, 3, 4 on transmission and on reception, the monopulse beamforming in transmission being obtained through a dual-coding, respectively in frequency 101, 102 and in phase 103, 104, according to the four quadrants of the antenna.

The invention advantageously solves the problem posed by improving the resolution and the precision of angular location of the antenna for a given antennal surface area by virtue of the multiplication of the sum and difference patterns produced at one and the same time in transmission and in reception. The sidelobes and the ambiguous lobes are limited on account of the adjacency of the sub-arrays and of their uniform distribution.

The range budget is optimized through the radiating surface area of the antenna which is a maximum, and through the fact that transmission and reception are separated, thereby reducing the coupling, therefore the noise in reception.

The beamforming carried out in transmission is limited to four beams obtained by summation and by differencing, this not requiring significant computational resources.

The angular estimations obtained in azimuth and in elevation are obtained in independent ways and these estimations are mutually decorrelated.

The composite antenna patterns are symmetric in azimuth and in elevation, thereby guaranteeing homogeneous location and detection quality in the angular observation domain.

It is possible to form wide-field or narrow-field patterns simultaneously, so as to ensure for example short-range and long-range detection.

It is possible to adjust the level of the sidelobes by tailoring the amplitude of the signals on transmission or on reception on the various sub-arrays.

There is no switching device in the antenna, this being favourable to the range budget. The processing is simple and easy to implement.

FIG. 1 illustrates the principle of disposition of the sub-arrays 11, 12 on the surface of the antenna 10. Hereinafter, the transmit sub-arrays will be denoted TX and the receive sub-arrays RX. Each sub-array is composed of a given number of radiating elements. An antenna of a radar according to the invention comprises P transmit antennal sub-arrays TX and Q receive antennal sub-arrays RX, the sub-arrays TX and RX being mutually adjacent. They have for example an identical aperture which is tailored to the desired coverage domain. In a preferential manner, all the transmit sub-arrays TX are identical and all the receive sub-arrays RX are identical. They are disposed in such a way as to comply with the following conditions:

Disperse the set of sub-arrays TX, RX over the surface of the antenna according to several horizontal rows and several vertical columns so as to obtain a symmetric distribution of these sub-arrays TX, RX along the vertical axis 5 and the horizontal axis 6, these two axes passing through the geometric centre of the antenna. Stated otherwise, each transmit sub-array 11 has a symmetric transmit sub-array 11' with respect to the vertical axis and a transmit sub-array 11" which is symmetric with respect to the horizontal axis. Likewise, each receive sub-array 12 has a receive sub-array 12' which is symmetric with respect to the vertical axis and a receive sub-array 12" which is symmetric with respect to the horizontal axis;

Distribute the transmit sub-arrays TX over the various rows and over the various columns so that at least two sub-arrays 11, 11' which are symmetric with respect to the vertical axis are the largest possible horizontal distance apart and that at least two other sub-arrays 11, 11" which are symmetric with respect to the horizontal axis are the largest possible horizontal distance apart between sub-arrays, having regard to the limits imposed by the available surface area of the antenna;

Distribute the receive sub-arrays RX over the various rows and over the various columns so that at least two sub-arrays 14, 14' which are symmetric with respect to the vertical axis are the largest possible horizontal distance apart and that at least two other sub-arrays 12, 12" which are symmetric with respect to the horizontal axis are the largest possible vertical distance apart between sub-arrays, having regard to the limits imposed by the available surface area of the antenna.

FIG. 1 presents an exemplary embodiment in the case of a rectangular surface, complying with the conditions hereinabove, where the number of rows is even, equal to 4, and the number of columns is even, equal to 6, and where P=Q=12.

Figure 2:
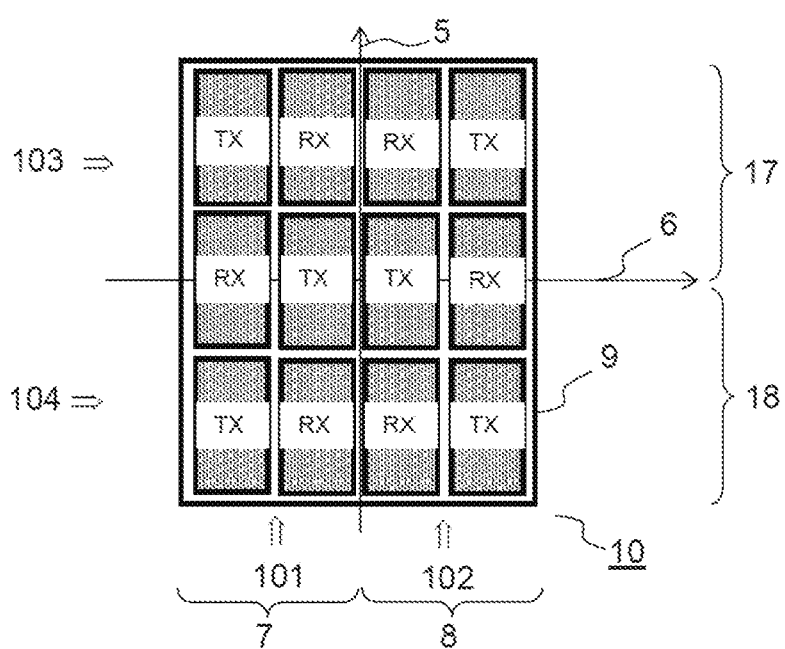
FIG. 2, an exemplary embodiment of the antenna where the number of rows is odd and where the number of columns is even.

FIG. 2 presents an exemplary embodiment where the number of rows is odd, equal to 3, and where the number of columns is even, equal to 4, and where P=Q=6. In this case, the horizontal axis of symmetry 6 passes through sub-arrays TX, RX which are themselves symmetric with respect to this axis.

Other configurations are of course possible, for example with a different number P of transmit antennal sub-arrays from the number Q of receive antenna sub-arrays, according in particular to the technological constraints imposed by the internal architectures of the integrated components used in transmission and in reception. The contour 9 of the antenna may also not be rectangular as will be shown hereinafter by other exemplary embodiments.

In cooperation with a type of antenna such as illustrated by FIGS. 1 and 2, a radar according to the invention:

Carries out on the basis of a common oscillator reference a dual-coding of the radar transmission, by rows and by columns of transmit sub-arrays according to two different types of coding, respectively by frequency modulation (according to the columns 101, 102 of the quadrants for example) and by phase modulation (according to the rows 103, 104 of the quadrants for example), in such a way as to carry out transmissions that are orthogonal at one and the same time between the various rows or grouping of rows of sub-arrays and between the various columns or grouping of columns of sub-arrays;

Forms a sum channel and a difference channel on transmission according to the angle of azimuth by carrying out on transmission a grouping of some of the sub-arrays of the left half 7 of the antenna and in a symmetric manner an identical grouping of sub-arrays of the right part 8 of the antenna;

Forms a sum channel and a difference channel on transmission according to the angle of elevation by carrying out on transmission a grouping of some of the sub-arrays of the upper half 17 of the antenna and in a symmetric manner an identical grouping of some of the sub-arrays of the lower half 18 of the antenna;

Forms a sum channel and a difference channel in reception according to the angle of azimuth by using the signals received of a first grouping of receive sub-arrays on the left half 7 and of a second identical and symmetric grouping on the right half 8 of the antenna;

Forms a sum channel and a difference channel in reception along the elevation axis by using the signals received of a first grouping of receive sub-arrays on the upper half 17 and of a second identical and symmetric grouping on the lower half 18 of the antenna;

Forms the transmission reception composite radiation beams corresponding to the sum and differences channels, separately according to the angles of azimuth and of elevation;

Detects and estimates by deviometry the position of the targets on the basis of the sum and differences channels thus formed.

These processing phases are described in greater detail hereinafter with the aid of exemplary embodiments of an antenna of a radar according to the invention.

Before presenting these exemplary embodiments, we return to the principle of construction of such an antenna.

Figure 3:
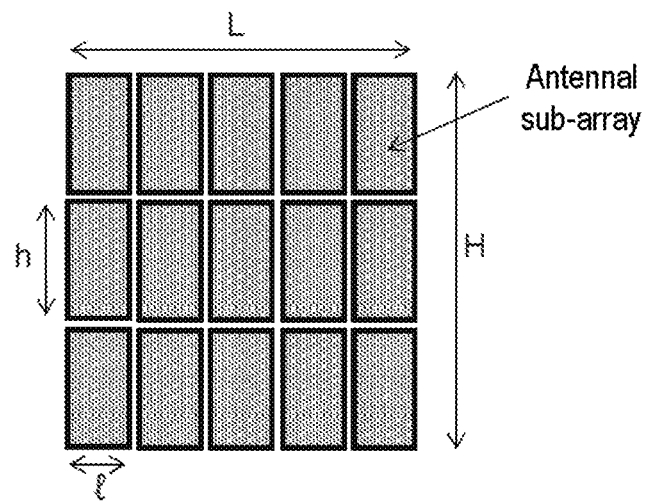
FIG. 3, an exemplary embodiment of the antenna delimited by a rectangular perimeter.
Figure 4:
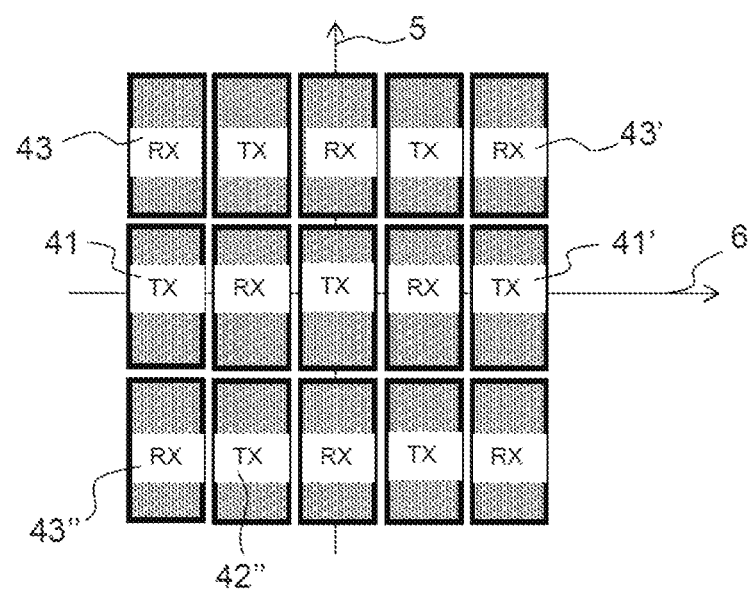
FIG. 4, another exemplary embodiment of the antenna with three rows and five columns.

FIGS. 3 and 4 illustrate the principle of embodiment of the antenna, the latter comprising three rows and five columns of antenna sub-arrays in the example presented.

A first construction step consists in optimizing the number and the distribution of the transmission and receive antennal sub-arrays on the surface of the antenna, which surface is of limited area.

Accordingly, we consider a planar array antenna whose contour is inscribed in a perimeter of determined dimensions. In the example of FIG. 3, the perimeter is a rectangle of horizontal length L and of vertical length H, and whose angular coverage domain is imposed and corresponds to a cone of 3 dB aperture $\Delta\theta_{el}$ radians in elevation and $\Delta\theta_{az}$ radians in azimuth. This antenna consists of a certain number of sub-arrays assigned to transmission, and of a certain number of sub-arrays assigned to reception.

In a conventional manner, the maximum dimensions of the transmission and receive antennal sub-arrays constituting this antenna are determined, i.e. a vertical maximum height h of the order of $\lambda/\Delta\theta_{el}$ and a horizontal maximum width $l=\lambda/\Delta\theta_{az}$.

It is chosen to dimension the antennal sub-arrays according to their maximum dimension so as to exactly cover the desired angular domain, in order to restrict the number of transmit channels and of receive channels of the radar.

This leads to a horizontal dimension $l=\lambda/\Delta\theta_{el}$ and to a vertical dimension $h=\lambda/\Delta\theta_{el}$. It is chosen moreover to use the maximum of radiation surface area in the dimensions allowed for the antenna, so as to optimize both the angular resolution and the range budget of the radar.

In this case, an advantageous solution is for P rows of sub-arrays to be superposed along the vertical axis and for Q columns of sub-arrays to be aligned according to the horizontal plane, where P is the integer value of (H/h) and Q is the integer value of (L/l).

Typically, for an automobile radar operating at a frequency of 76 GHz, the wavelength is 3.9 mm, the angular aperture sought is for example of the order of 0.15 rd in elevation and 0.25 rd in azimuth. The sub-arrays are embodied in printed circuit technology of "patch" type, and the height of a sub-array is for example in this case of the order of 2.5 cm and its width of the order of 1.5 cm.

Moreover the maximum dimensions of the antenna are themselves imposed, typically less than 8 cm in height and in width.

Thus, according to these values, it is theoretically possible to implant 15 sub-arrays 2.5 cm in height and 1.5 cm in width according to three rows and five columns in accordance with FIG. 3.

It is thereafter necessary to choose the number of sub-arrays TX assigned to transmission and the number of sub-arrays RX assigned to reception. The maximum number of antenna sub-arrays being determined, a first requirement is imposed, namely that the distribution of the transmit sub-arrays and of the receive sub-arrays be symmetric both with respect to a horizontal axis 6 situated at mid-height of the antenna, and with respect to a vertical axis 5 situated at mid-width of the antenna.

A second requirement is imposed, namely that at least two transmit sub-arrays 41, 41' and two receive sub-arrays 43, 43' which are symmetric with respect to the vertical axis of symmetry be disposed in such a way that the phase centres of each of these two sub-arrays are the largest possible horizontal distance apart having regard to the available implantation width.

A third requirement is imposed, namely that at least two transmit sub-arrays 42, 42' and two receive sub-arrays 43, 43' which are symmetric with respect to the horizontal axis of symmetry be disposed in such a way that the phase centres of each of these two sub-arrays are the largest possible vertical distance apart having regard to the available implantation width.

A fourth requirement is imposed, namely the most uniform possible distribution of the transmit sub-arrays and of the receive sub-arrays on the antenna, the transmit sub-arrays TX and receive sub-arrays RX being adjacent, and finally alternated.

The requirement to minimize the number of transmit channels is also imposed, so as to simplify the physical architecture, reduce consumption and the risks of transmit receive coupling.

In this case, according to the above example of an antenna comprising three rows and five columns of sub-arrays, one arrives for example at the exemplary configuration of FIG.

4 hereinbelow, in which the sub-arrays TX and RX are alternated along the vertical axis and along the horizontal axis.

In the case of an antenna comprising an odd number of rows and/or of columns, the symmetry of construction imposes the requirement that the axes of symmetry 5, 6 pass through the sub-arrays of the middle row and/or column, these themselves being symmetric with respect to the axis 5, 6.

In the example of FIG. 4, the antenna comprises seven sub-arrays TX and eight sub-arrays RX and corresponds to an optimum case from the point of view of the radiation of the antenna, having regard to the surface area available.

However, as far as automobile radars are concerned, the choice of the number of transmit sub-arrays TX and of the number of receive sub-arrays RX may be constrained by the architecture of the transmission and reception microwave-frequency integrated circuits associated with these sub-arrays. The exemplary embodiments presented hereinafter will be suitable for imposed architectures of microwave-frequency integrated circuits.

Figure 5:
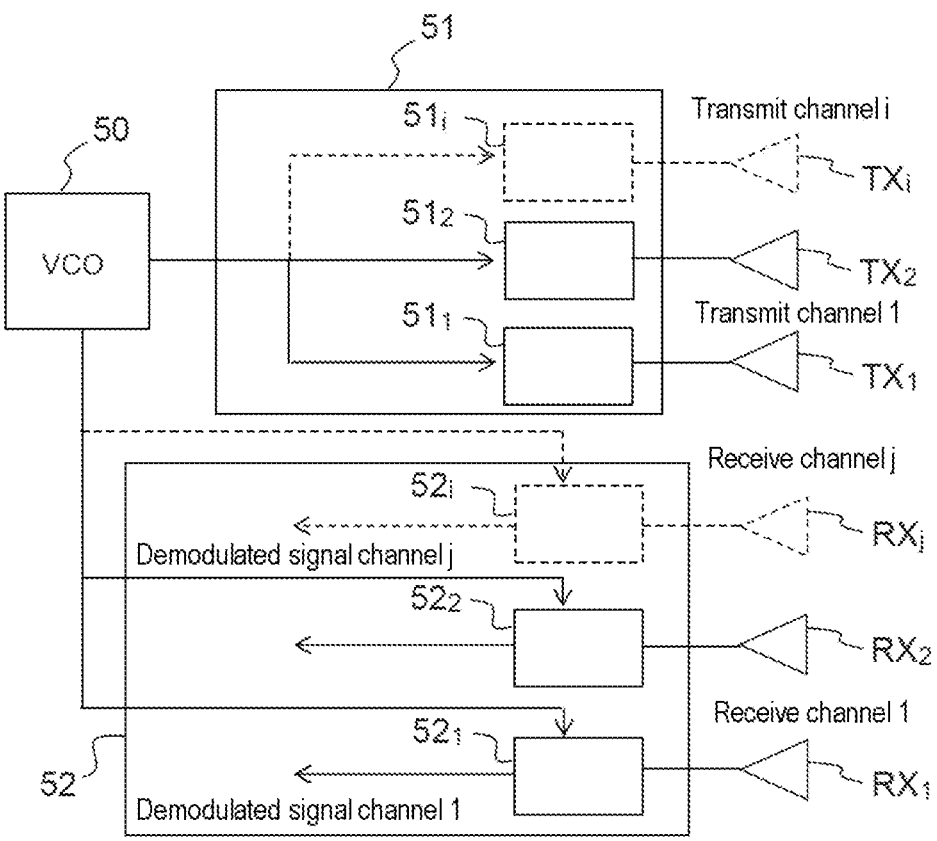
FIG. 5, an exemplary transmit and receive system able to be coupled to the said array antenna.

FIG. 5 presents an example of a transmission and reception circuit able to be coupled to the sub-arrays of an antenna 1 of a radar according to the invention. The functions of the circuit can be integrated on one or more semi-conductor components.

For transmission, this circuit comprises:
A voltage controlled oscillator 50, also called VCO functioning as FMCW waveform generator, able to feed several transmit channels;
A transmitter 51, composed of several transmit channels 511, 512, 51i each comprising at least one power amplifier and a phase modulator with two states $(0, \pi)$, each of these channels feeding a transmit antenna sub-array $TX_1$, $TX_2$, $TX_i$.

For reception, it comprises:
The same VCO 50 to perform the demodulation of the signals received on the receive channels;
A receiver 52, composed of several receive channels 521, 522, 52i comprising at least one low noise amplifier, a synchronous demodulation function and a filter, each of these channels receiving a signal of a receive antennal sub-array $RX_1$, $RX_2$, $RX_i$.

The receive channels carry out for example the direct demodulation of the various signals received by the signal arising from the VCO. The digital conversion of the signals received can also be integrated into the same component as the reception function.

The functions of VCO, of transmission TXi and of reception RXj can be integrated on different chips or on one and the same chip.

Several levels of integration of transmission and reception circuits are possible. The architecture of the antenna can then advantageously be adapted to suit one or the other of these integration levels.

Figure 6:
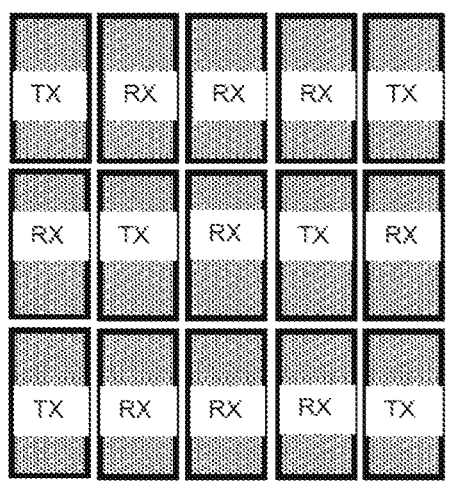
FIG. 6, an exemplary antenna configuration suitable for a type of transmit and receive system composed of a given number of integrated circuits.

FIG. 6 presents an antenna configuration corresponding to an integration level where two transmit channels are integrated on one and the same chip, three receive channels are integrated on one and the same chip with a separate VCO. Referring to FIG. 5, this amounts to having $TX_1$ and $TX_2$ on one and the same chip, and $RX_1$, $RX_2$ and $RX_3$ on another chip. Using these integrated components, available in particular on the market, the antenna configuration comprises a multiple of 2 TX (2 transmit sub-arrays) and of 3 RX (3 receive sub-arrays). In the case of FIG. 6, the multiple is 3, the antenna comprising 15 antennal sub-arrays, of which 6 are transmit sub-arrays TX and 9 are receive sub-arrays RX, the latter being disposed according to the previously defined rules. Three transmission chips $TX_1$, $TX_2$ and three reception chips $RX_1$, $RX_2$, $RX_3$ are therefore used.

Figure 7:
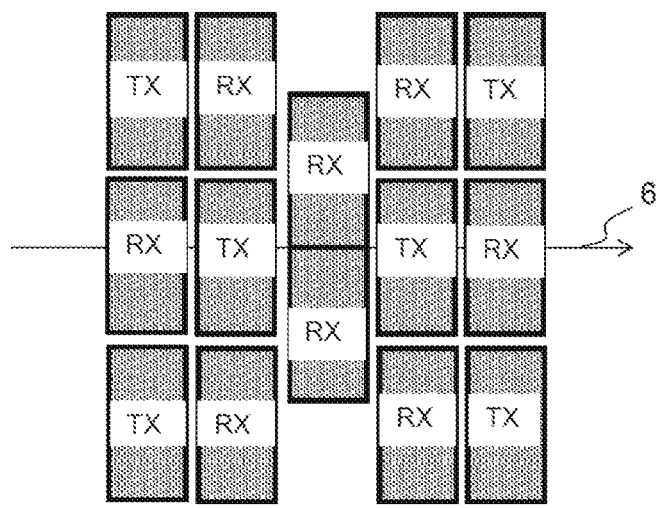
FIG. 7, an exemplary antenna configuration suitable for a transmit system composed of two integrated circuits each comprising three transmit channels, four receive channels and a waveform generator.

FIG. 7 presents an antenna configuration corresponding to an integration level where three transmit channels, four receive channels and the VCO are on one and the same chip. With reference to FIG. 5, an integrated circuit therefore comprises 3 TX, 4 RX and a VCO, i.e. $TX_1$, $TX_2$ and $TX_3$ and $RX_1$, $RX_2$, $RX_3$ and $RX_4$ and the VCO on one and the same chip. Using this integrated circuit, the antenna configuration comprises a multiple of 3 TX and 4 RX. In the case of FIG. 7, two integrated circuits are used, the multiple being equal to 2. The antenna therefore comprises 14 antennal sub-arrays, distributed as 6 sub-arrays TX and 8 sub-arrays RX.

To establish the configuration, a receive sub-array RX is deleted with respect to the configuration of FIG. 6. This sub-array is deleted on the middle column, the two sub-arrays remaining being shifted so as to be symmetric with respect to the horizontal axis of symmetry 6.

The configuration of FIG. 7 is an advantageous solution suitable for the use of the integrated circuits 3 TX, 4 RX.

This solution will be considered, by way of example, as reference solution hereinafter.

Figure 8:
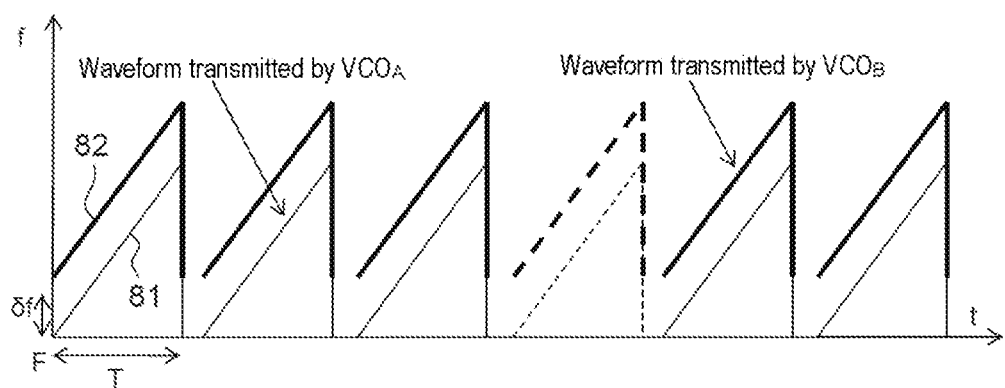
FIG. 8, an example of a first coding of the transmitted waves.

FIG. 8 presents a first type of coding used by the invention, more precisely the frequency coding applied according to one dimension of the antenna, the coding applied according to the other dimension being the phase coding which will be presented hereinafter.

According to the invention, this first coding of the transmitted wave is carried out by generating series of ramps of identical frequencies 81, 82 but shifted in frequency. Each of these ramps is generated by a VCO.

The coding can be carried out in a preferential manner by generating a first transmission waveform 81 producing in a periodic manner a first frequency ramp with the aid of a first VCO, denoted $VCO_A$, and a second identical waveform 82 synchronous with the first but frequency shifted by a discrepancy $\delta f$, with the aid of a second VCO, denoted $VCO_B$, the two VCOs being driven by one and the same reference clock. These frequency ramps are coherent and mutually orthogonal.

Such a coding is known. It is in particular described for example in the article by Matthias Steinhauer "Millimeter-Wave-Radar Sensor Based on a Tranceiver Array for Automotive Applications", IEEE Transactions on Microwave Theory and Techniques (Volume 56, pages 262-269, February 2008).

We now refer to FIG. 9 which again depicts the antenna presented in FIG. 7. The latter is separated into two parts, two halves. A first half 91 comprises the antennal sub-arrays situated in the left part of the antenna as well as the upper receive sub-array RX7 of the middle column. The second half 92 comprises the antennal sub-arrays situated in the right part of the antenna as well as the lower receive sub-array RX8 of the middle column. The coding illustrated by FIG. 8 makes it possible to distinguish these two halves.

Thus, according to the invention, the waveform arising from the $VCO_A$ feeds the transmit channels TX of a first half 91 and is also used as demodulation reference for the receive channels RX of this first half 91.

Likewise the waveform arising from the $VCO_B$ feeds the transmit channels TX of the other half 92 and is also used as demodulation reference for the receive channels RX of this other half 92.

For example, the $VCO_A$ feeds the left part of the antenna and the $VCO_B$ the right part in a symmetric manner.

Figure 9:
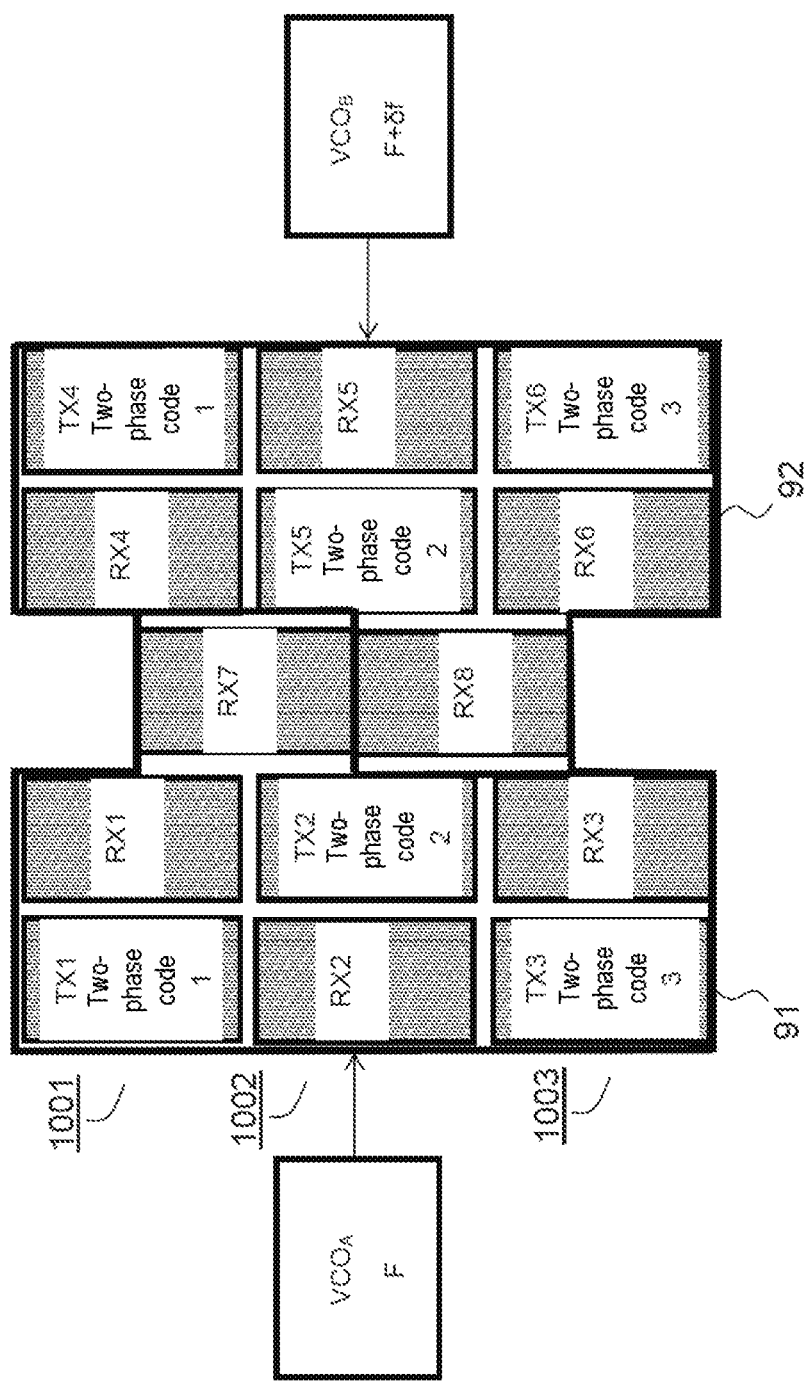
FIG. 9, the array antenna of FIG. 7 separated into two halves, left and right, which are symmetric with respect to the intersection of the vertical and horizontal axes of the antenna.

By numbering the various antenna arrays TX and RX according to FIG. 9, the $VCO_A$ is for example associated with the sub-arrays $TX_1$, $TX_2$, $TX_3$ for transmission and with the sub-arrays $RX_1$, $RX_2$, $RX_3$, $RX_7$ for demodulation in reception. In a symmetric manner, the $VCO_B$ is associated with $TX_4$, $TX_5$, $TX_6$ for transmission and $RX_4$, $RX_5$, $RX_6$, $RX_8$ for demodulation in reception.

Figure 10:
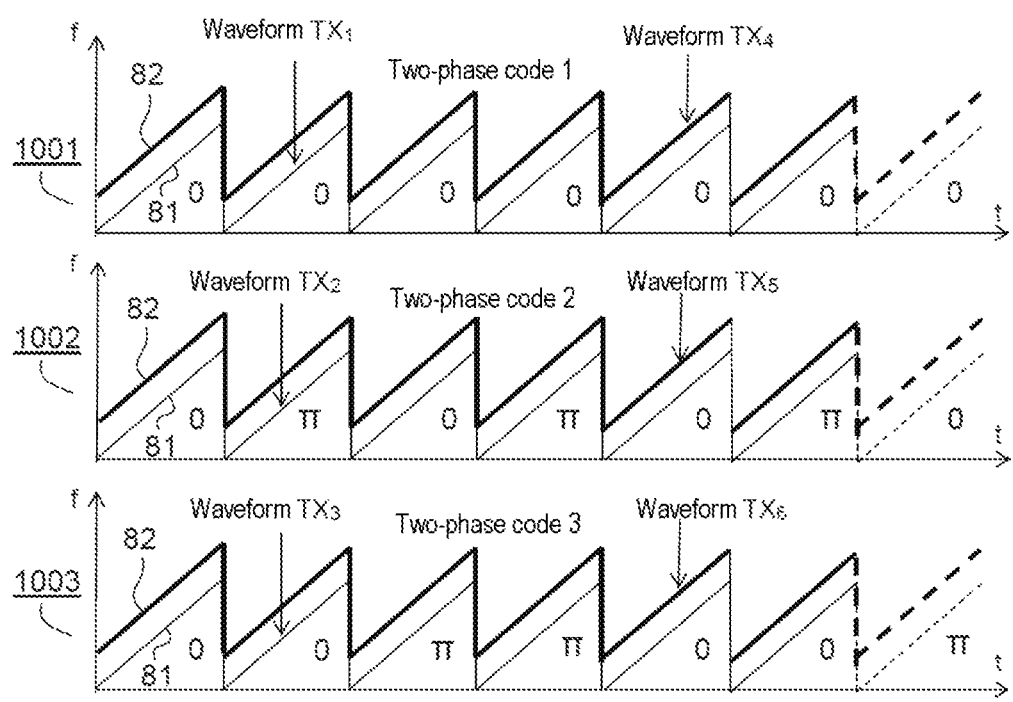
FIG. 10, examples of codings by phase modulation from ramp to ramp, according to rows or columns of the array antenna.

FIG. 10 illustrates the second coding, performed according to the other dimension, that is to say according to the rows. This second coding, now performed in phase, is carried out at the level of the various transmit channels 511, 512, 51i of the transmission and reception circuit.

This coding is performed from ramp to ramp, with the aid of a two-phase modulation, comprising two possible phase states, 0 and π. The various codes are mutually orthogonal. In a preferential manner, the various transmit channels of one and the same row are modulated by the same code.

In a preferential manner the codes chosen are Hadamard codes. These codes comprise $M=2^p$ moments and are perfectly mutually orthogonal on a burst of M successive ramps. Other orthogonal codes are of course possible.

FIG. 10 presents three phase codes 1001, 1002, 1003 performed from ramp to ramp, that is to say that the phase code is able to vary from one ramp to the next. The first code 1001 assigns the phase value 0 on all the ramps. The second code 1002 assigns the value 0 on every second ramp alternately with the value π. The third code assigns the code 0 on two successive ramps and then codes them π on the next two ramps and so on and so forth.

Referring to FIG. 9, the first phase code 1001 is assigned to the first row, i.e. to the transmit channels feeding the sub-arrays TX1 and TX4. The second phase code 1002 is assigned to the first row, i.e. to the transmit channels feeding the sub-arrays TX2 and TX5. The third phase code 1003 is assigned to the first row, i.e. to the transmit channels feeding the sub-arrays TX3 and TX6.

Figure 11:
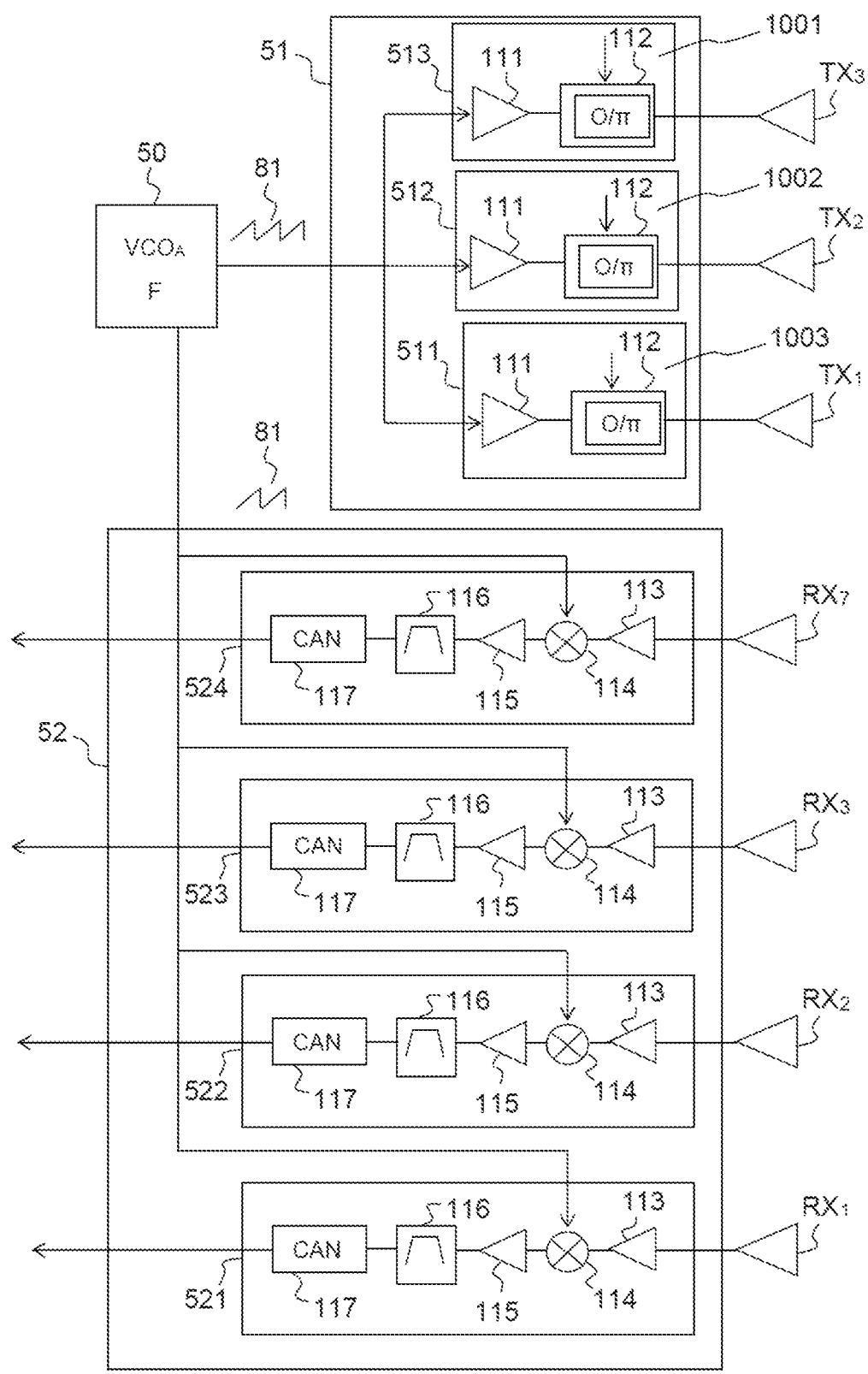
FIG. 11, an exemplary transmit system able to be embodied on a single integrated circuit.

FIG. 11 presents the diagram of the transmission and reception circuit assigned to a half-antenna, more particularly to the left part 91, all the elements of the circuit being able advantageously to be integrated into one and the same component. With respect to the diagram of FIG. 5, the latter exhibits the three transmit channels 511, 512, 513 and the four receive channels 521, 522, 523, 524. The VCO delivers the low-level transmission signal according to the first frequency ramp 81, thus producing the first code, in frequency. The signal is amplified by a power amplifier 111 in each transmit channel, and this is followed by a phase-shifter 112. The latter applies the code associated with the transmit channel, as described previously.

In reception, each channel comprises at input a mixer 114 receiving on a first input the signal received arising from the associated sub-array, optionally amplified by a first amplifier 113. The second input of the mixer receives the ramp signal 81 provided by the VCO. The signal received is thus demodulated and amplified at the output of the mixer by a low noise amplifier 115. A filtering 116 and an analogue-digital conversion follow this amplifier, the receive channel delivering as output a digitized signal able to be processed by the radar processing means.

In a symmetric manner, one and the same circuit is coupled to the right part 92 of the antenna, with a VCO delivering the shifted frequency ramp 82.

In the processing at the output of the reception chain, on the basis of these signals received and digitized, the frequency separation and distance compression of the signals arising from the transmission produced by the two VCOs is carried out.

In an FMCW radar, it is known to the person skilled in the art to limit the output passband of the receiver with the aid of a low-pass filter whose cutoff frequency is tailored to the maximum instrumented range, so as to process only the useful signals.

Thus for a modulation band ΔF and a ramp duration T, an echo corresponding to a target situated at the maximum instrumented distance $D_{max}$ of the radar, the maximum beat frequency $f_{bmax}$ is (excluding doppler which introduces a negligible discrepancy):

$$f_{bmax} = \frac{\Delta F}{T} \frac{2D_{max}}{C} \quad (1)$$

where C is the velocity of light.

In the usual case where the transmission signal is used to demodulate the reception signal, the frequency spectrum resulting from the synchronous demodulation thus extends from 0 to $+f_{bmax}$ The cutoff frequency of the low-pass filter is thus chosen equal to $f_{bmax}$.

According to the particular architecture illustrated by FIG. 9, the various receivers receive from one and the same target echoes originating from the transmission arising from $VCO_A$ in a band lying between F and F+ΔF and other echoes originating from the transmission arising from $VCO_B$ in a band F−δf and F−δf+ΔF.

For the receivers whose demodulation signal is generated by $VCO_A$, the reception frequency band after demodulation thus extends from 0 to $f_{bmax}$ for the signals transmitted on the basis of $VCO_A$ and extends from −δf to $−δf+f_{bmax}$ for the signals transmitted on the basis of $VCO_B$.

Figure 12:
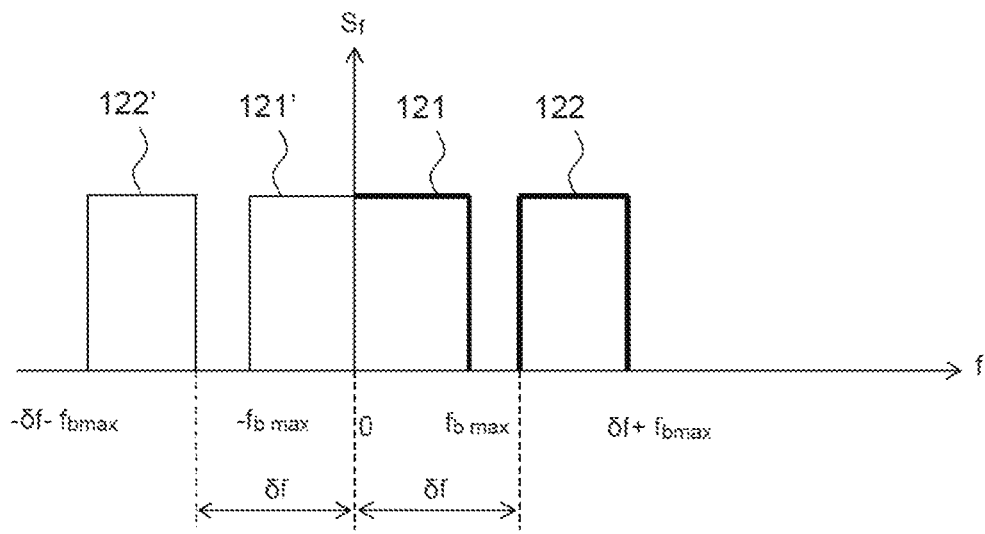
FIG. 12, the spectral bands respectively of the signals received demodulated by a first waveform for the signals arising from the transmission of the said first waveform and of a second waveform.

Thus, by choosing a frequency discrepancy δf between the two VCOs which is greater than the beat frequency $f_{bmax}$, the frequency spectra of the reception signals demodulated by one of the VCOs and originating from the transmissions on the basis of the two VCOs occupy disjoint bands and can be separated by filtering, this is illustrated by FIG. 12.

FIG. 12 illustrates the spectral bands 121, 122 corresponding to the received signals demodulated by $VCO_A$, the VCO of the first transmission and reception circuit, in a system of axes where the abscissae represent the frequencies f and the ordinates the amplitude of the spectrum. The first domain 121 lying between α and $f_{bmax}$ is the spectral domain of the echoes resulting from the transmission arising from $VCO_A$ after demodulation by $VCO_A$. The second domain 122 lying between δf and $δf+f_{bmax}$ is the spectral domain of the echoes resulting from the transmission arising from $VCO_B$ after demodulation by $VCO_A$.

Symmetrically with respect to the axis f=0, the domains 121' and 122' represent respectively the spectral domain of the echoes resulting from the transmission arising from $VCO_A$ after demodulation by $VCO_B$ and the spectral domain of the echoes resulting from the transmission arising from $VCO_B$ after demodulation by $VCO_B$.

Thus by carrying out a bandpass filtering in reception comprising two distinct sub-bands, as is illustrated by FIG. 12, it is possible to separate on each receive channel the signals resulting from the transmissions of the two VCOs. Stated otherwise, the frequency coding makes it possible to separate the signals depending on whether they are transmitted by the left part 91 or the right part 92 of the antenna.

Assuming the phase at the origin of the frequency ramps of $VCO_A$ to be equal to zero, the signal $s_{i,j}(t)$ received at the instant t on the receiver of index j associated with sub-array $RX_j$, after demodulation by $VCO_A$ and in relation to a transmission carried out on the basis of $VCO_A$ feeding the transmitter of index i associated with $TX_i$, may be written:

$$s_{i,j}(t) = Ae^{-2j\pi \cdot \frac{(D_i(t)+D_j(t))}{C}F} \cdot e^{-2j\pi\left(\frac{(D_i(t)+D_j(t))\Delta F}{CT} + \frac{2v_r}{\lambda}\right)t} e^{-2j\pi\varphi 0_i(mTr)} \quad (2)$$

where the exponent of the first term of the product is the phase term which is dependent on the distance and the angle of the target with respect to TXi and to RXj, and the exponent of the second term is the frequency $f_b$, distance/Doppler ambiguous distance frequency.

with

A: amplitude of the received signal

ΔF: band of modulation of the FMCW ramp

F: $VCO_A$ ramp start frequency $D_i(t)$: distance between the phase centre of the transmit sub-array $TX_i$ and the target at the instant t $D_j(t)$: distance between the phase centre of the receive sub-array $RX_j$ and the target at the instant t vr: speed of movement of the target t: time, with $$t = mTr + \frac{(D_i(t)+D_j(t))}{C}$$

C: velocity

λ: wavelength of the transmission signal, considered to be constant in relation to the doppler effect $\varphi 0_i(mTr)$: phase at the origin of the frequency ramp transmitted by the transmitter $TX_i$ at recurrence Tr of rank m, according to the phase code applied to $TX_i$ where $$t = mTr + 2\frac{(D_i(t)+D_j(t))}{C}$$

The second term of equation (2) can be simplified by taking account of the fact that $D_i(t)$ is substantially equal $D_j(t)$ and by putting:

$$D(t) = \frac{(D_i(t)+D_j(t))}{2} \quad (3)$$

$$F_d = \frac{2V_r}{\lambda} \quad (4)$$

$$\text{and } f_b = \frac{2D(t)\Delta F}{CT} + F_d$$

On the scale of a frequency ramp 81, 82, the distance of the target can be considered to be constant, and D(t)=D. In this case:

$$f_b = \frac{2D\Delta F}{CT} + F_d \quad (5)$$

and $$s_{i,j}(t) = Ae^{-2j\pi \cdot \frac{(D_i(t)+D_j(t))}{C}F} \cdot e^{-2j\pi f_b t} e^{-2j\pi\varphi 0_i(mTr)} \quad (6)$$

Likewise, assuming the phase at the origin of the frequency ramps of $VCO_B$ to be equal to zero, the signal $s_{k,j}(t)$ received on the receiver of index j associated with $RX_j$, after demodulation by $VCO_A$ in relation to a transmission carried out on the basis of $VCO_B$ at the frequency F+δf feeding the transmitter of index k associated with $TX_k$, may be written:

$$s_{k,j}(t) = Ae^{-2j\pi \cdot \frac{(D_k(t)+D_j(t))}{C}(F+\delta f)} \cdot e^{-2j\pi(f_b+\delta f)t} e^{-2j\pi\varphi 0_k(mTr)} \quad (7)$$

where:

$D_k$ is the distance between the phase centre of the transmit sub-array $TX_k$ and the target;

$\varphi 0_k(mTr)$ is the phase at the origin of the frequency ramp transmitted by the transmitter $TX_k$ at recurrence Tr of rank m, according to the phase code applied to $TX_k$.

For the receivers whose demodulation signal is generated by $VCO_A$, the reception frequency band after demodulation thus extends from 0 to $f_{bmax}$ for the signals transmitted on the basis of $VCO_A$ and extends from −δf to −δf+$f_{bmax}$ for the signals transmitted on the basis of $VCO_B$. (neglecting the doppler frequency which is very small compared with the transmission frequency discrepancy δf).

It is then possible to separate on reception the signals originating from the two VCOs, by a bandpass filtering, performed in a preferential manner digitally, typically by a Fourier transform (FFT or DFT).

The demodulation followed by the Fourier transform corresponds in a conventional manner to the compression of the signal in distance, according to a resolution $$\Delta D = \frac{C}{2\Delta F}.$$

Figure 13:
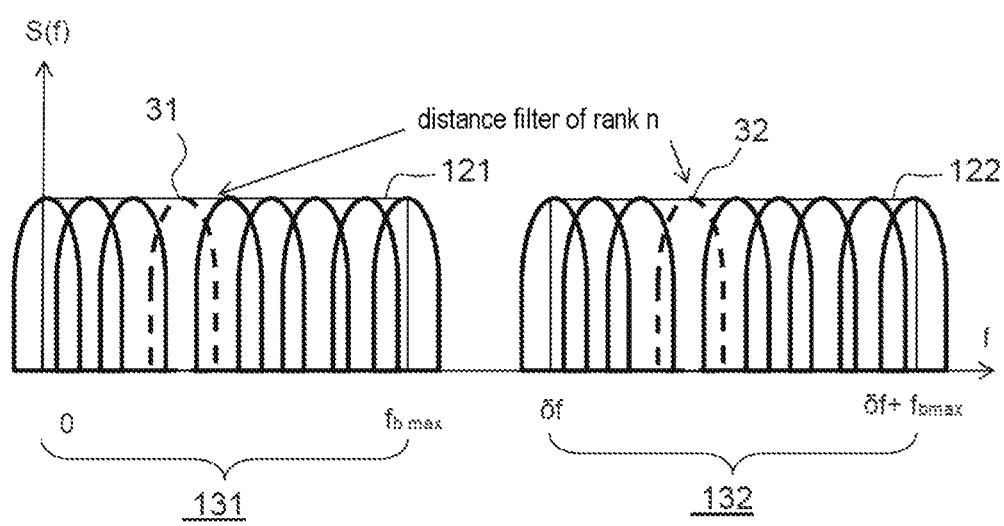
FIG. 13, the banks of filters disposed inside the two previous sub-bands.

On output from the filtering, the signal is decomposed into N distance filters (or distance bins) in accordance with FIG. 13.

This decomposition is performed in an identical manner for the signals transmitted by $VCO_A$ and demodulated by this same $VCO_A$ and for the signals transmitted by $VCO_B$ and demodulated by $VCO_A$.

FIG. 13 therefore illustrates the banks of filters thus created disposed inside the two sub-bands 121, 122. A first bank 131 of N distance filters corresponds to the transmission arising from $VCO_A$ and to the demodulation by $VCO_A$. A second bank 132 of N distance filters corresponds to the transmission arising from $VCO_B$ and to the demodulation by $VCO_A$. The two sub-bands 121, 132 can thus be decomposed into distance bins.

Thus, in the first bank 131 of N filters corresponding to the transmission $TX_i$ arising from $VCO_A$, for the receiver $RX_j$, the phase of the signal on output from a distance filter 31 of rank n at the recurrence m is equal, in accordance with relation (6), to:

$$\varphi_{i,j}(mTr) = -2j\pi \cdot \frac{(D_i(t)+D_j(t))}{C}F - 2j\pi\varphi 0_i(mTr) \quad (8)$$

In the second bank 132 of N filters corresponding to the transmission $TX_k$ arising from $VCO_A$, for the receiver $RX_j$, the phase of the signal on output from a distance filter 32 of rank n at the recurrence m is equal, in accordance with relation (7), to:

$$\varphi_{k,j}(mTr) = -2j\pi \cdot \frac{(D_k(t) + D_j(t))}{C}(F + \delta f) - 2j\pi\varphi 0_k(mTr) \quad (9)$$

The signals on output from these filters of rank n at the recurrence of order m can be written in a simplified form respectively:

$$U_{i,j}(n, m) = Ae^{-2j\pi \cdot \frac{(D_i(t)+D_j(t))}{C}F} e^{-2j\pi\varphi 0_i(mTr)} \quad (10)$$

and $$U_{k,j}(n, m) = Ae^{-2j\pi \cdot \frac{(D_k(t)+D_j(t))}{C}(F+\delta f)} e^{-2j\pi\varphi 0_k(mTr)} \quad (11)$$

After distance separation by the above processing, corresponding to short time, performed on each frequency ramp, the radar processing means carry out for example in a conventional manner a coherent integration processing on the doppler axis, aimed at optimizing the signal-to-noise ratio and at separating the targets as a function of their speed, by digital Fourrier transform (FFT or DFT).

This processing is preceded by a phase correlation aimed at separating the received signals corresponding to the various transmission rows TX of the antenna.

This processing is performed on a set of M successive frequency ramps, for each distance filter or optionally on a limited number of distance filters corresponding to the desired detection domain.

In expressions (10) and (11) hereinabove, the distance terms $D_i(t)$, $D_j(t)$ and $D_k(t)$ are dependent at one and the same time on the initial distance, on the radial speed and on the angular location of the targets in the course of the Doppler burst.

Thus, for a given target, by taking the physical centre of the array antenna as origin O and by denoting:

- $dx_i$: height of the phase centre of the antennal sub-array $RX_i$ with respect to O
- $dy_i$: horizontal distance of the phase centre of the antennal sub-array $RX_i$ with respect to O
- $dx_k$: height of the phase centre of the antennal sub-array $T_k$ with respect to O
- $dy_k$: horizontal distance of the phase centre of the antennal sub-array $TX_k$ with respect to O
- $dx_k$: height of the phase centre of the antennal sub-array $T_k$ with respect to O
- $dy_k$: horizontal distance of the phase centre of the antennal sub-array $TX_k$ with respect to O
- $\theta_{az}$: angle of azimuth of the target considered
- $\theta_{el}$: angle of elevation of the target considered
- $D_0$: Distance between the antenna and the target at the temporal origin of a doppler burst consisting of M successive ramps We can write:

$$D_k(t) = D_0 + V_r t + (dx_k \sin(\theta_{el}) + dy_k \sin(\theta_{az}))$$

$$D_j(t) = D_0 + V_r t + (dx_j \sin(\theta_{el}) + dy_j \sin(\theta_{az}))$$

$$D_i(t) = D_0 + V_r t + (dx_i \sin(\theta_{el}) + dy_i \sin(\theta_{az}))$$

The signals $U_{i,j}(n, m)$ on output from the distance filtering can thus be written according to the following relation (12):

$$U_{i,j}(n, m) = Ae^{\frac{-4j\pi D_0 F}{C}} e^{-2j\pi F_d t} e^{-2j\pi \cdot \frac{(dx_i+dx_j)\sin(\theta_{el})+(dy_i+dy_j)\sin(\theta_{az})}{C} F} e^{-2j\pi\varphi 0_i(mTr)}$$

where the exponents represent successively:
- A phase term dependent on the distance;
- A phase term dependent on the speed of the target;
- A phase term dependent on the angular location;
- A phase term dependent on the phase at the origin of the frequency ramp m for the transmit channel associated with the sub-array TXi, according to the phase code applied.

and:

$$U_{k,j}(n, m) = Ae^{\frac{-4j\pi D_0(F+\delta f)}{C}} e^{-2j\pi F_d t} \quad (13)$$

$$e^{-2j\pi \cdot \frac{(dx_k+dx_j)\sin(\theta_{el})+(dy_k+dy_j)\sin(\theta_{az})}{C}(F+\delta f)} e^{-2j\pi\varphi 0_K(mTr)}$$

$$\text{with } F_d = \frac{2v_r F}{C} \# \frac{2v_r(F+\delta f)}{C} \quad (14)$$

The phase correlation operations and the Doppler compression are performed in a single operation by carrying out a Fourrier transform on the signal output by the distance filter modulated by the conjugate of the phase code applied to the TXi considered:

$$V_{i,j}(l, n) = \sum_{m=0}^{M-1} U_{i,j}(n, m) e^{+2j\pi\varphi 0_i(mTr)} e^{+2j\pi\frac{lm}{M}} \quad (15)$$

For a target of doppler frequency $$F_d = \frac{l}{MT_r}$$

corresponding to me centre of a doppler filter of rank l, the output of the doppler filter corresponding to the receiver $RX_j$ for the signal transmitted by the transmitter $TX_i$ can be written in the simplified form:

$$W_{i,j}(n, l) = Ae^{\frac{-4j\pi D_0 F}{C}} e^{-2j\pi \cdot \frac{(dx_i+dx_j)\sin(\theta_{el})+(dy_i+dy_j)\sin(\theta_{az})}{C} F} \quad (16)$$

and likewise, the output of the doppler filter corresponding to the receiver $RX_j$ for the signal transmitted by the transmitter $TX_k$ can be written in the simplified form:

$$W_{k,j}(n, l) = Ae^{\frac{-4j\pi D_0(F+\delta f)}{C}} e^{-2j\pi \cdot \frac{(dx_k+dx_j)\sin(\theta_{el})+(dy_k+dy_j)\sin(\theta_{az})}{C}(F+\delta f)} \quad (17)$$

Thus, returning to the configuration of FIG. 9, it is possible to compute for each receiver the response corresponding to each transmitter in a separate manner.

For example, for the receive channel associated with sub-array $RX_1$, the responses are the following for the various transmissions:

$$TX_1: W_{1,1}(n, l) = Ae^{\frac{-4j\pi D_0 F}{C}} e^{-2j\pi \cdot \frac{(dx_1+dx_1)sin(\theta_{el})+(dy_1+dy_1)sin(\theta_{az})}{C}F}$$

$$TX_4: W_{4,1}(n, l) = Ae^{\frac{-4j\pi D_0(F+\delta f)}{C}} e^{-2j\pi \cdot \frac{(dx_4+dx_1)sin(\theta_{el})+(dy_4+dy_1)sin(\theta_{az})}{C}(F+\delta f)}$$

$$TX_2: W_{2,1}(n, l) = Ae^{\frac{-4j\pi D_0 F}{C}} e^{-2j\pi \cdot \frac{(dx_2+dx_1)sin(\theta_{el})+(dy_2+dy_1)sin(\theta_{az})}{C}F}$$

$$TX_5: W_{5,1}(n, l) = Ae^{\frac{-4j\pi D_0(F+\delta f)}{C}} e^{-2j\pi \cdot \frac{(dx_5+dx_1)sin(\theta_{el})+(dy_5+dy_1)sin(\theta_{az})}{C}(F+\delta f)}$$

$$TX_3: W_{3,1}(n, l) = Ae^{\frac{-4j\pi D_0 F}{C}} e^{-2j\pi \cdot \frac{(dx_3+dx_1)sin(\theta_{el})+(dy_3+dy_1)sin(\theta_{az})}{C}F}$$

$$TX_6: W_{6,1}(n, l) = Ae^{\frac{-4j\pi D_0(F+\delta f)}{C}} e^{-2j\pi \cdot \frac{(dx_6+dx_1)sin(\theta_{el})+(dy_6+dy_1)sin(\theta_{az})}{C}(F+\delta f)}$$

The same goes for the signals received on the other receive sub-arrays, thereby making it possible to compute in a general manner for each distance bin of rank n and for each doppler filter of rank l, the responses $W_{p,q}$ (l, n) for p=1 to 6 (index of the transmit sub-array) and for q=1 to 8 (index of the receive sub-array).

After having separated the received signals by virtue of the two types of codes used, it is by summing and by differencing these responses $W_{p,q}$ (l, n) that the sum and difference channels are formed subsequently.

The formation of the sum and difference channels is described hereinafter for transmission, and then for reception by the radar.

On the basis of the above processings, the signals received $W_{p,q}(l,n)$ on each receiver of index q are separated according to their origin transmitter of index p. As previously, the receive channel associated with the receive sub-array RX is named receiver RX. Likewise, the receive channel associated with the transmit sub-array TX is named transmitter TX.

These signals being thus separated, the sum channel $\Sigma$ and difference channel $\Delta$ on transmission are then formed separately and for each receiver of index p:
in azimuth:

$$\Sigma eaz_q(n,l) = \Sigma_{p=1}^{p=6} W_{p,q}(n,l) \quad (18)$$

$$\Delta eaz_q(n,l) = \Sigma_{p=1}^{p=3} W_{p,q}(n,l) - \Sigma_{p=4}^{p=6} W_{p,q}(n,l) \quad (19)$$

and in elevation:

$$\Sigma eel_q(n,l) = \Sigma eaz_q(n,l) = \Sigma_{p=1}^{p=6} W_{p,q}(n,l) \quad (20)$$

$$\Delta eel_q(n,l) = (W_{1,q}(n,l) + W_{4,q}(n,l)) - (W_{3,q}(n,l) + W_{6,q}(n,l)) \quad (21)$$

It is noted in this example that, for the elevation channel, only four transmitters are used in the vertical plane, the transmitters of the central row not being able to contribute to the production of the difference channel in elevation. In particular, relation (19) manifests the fact that the two transmit sub-arrays TX2 and TX5 of the middle row are not used since they cancel one another out and therefore afford no information.

The processing carries out a focusing of the transmission signal on three beams. For a given axis, azimuth or elevation, the sum channel and difference channel antenna patterns thus formed are identical in amplitude for all the receivers and their phase differs according to the position of the various receivers in the antenna array.

The reception beamforming processing is carried out by associating the received signals of each receiver after the transmission beamforming processing such as described previously.

This processing consists in independently producing the sum and difference channels according to the two axes, azimuth and elevation.
In azimuth:

$$\Sigma eraz(n,l) = \Sigma_{q=1}^{q=8} \Sigma eaz_q(n,l) \quad (22)$$

$$\Delta eraz(n,l) = \Sigma_{q=1}^{q=3} \Delta eaz_q(n,l) - \Sigma_{q=4}^{q=6} \Delta eaz_q(n,l) \quad (23)$$

It is noted in this example that only six receivers are used in the horizontal plane to produce the azimuthal delta channel, the receivers of the central column being unable to contribute to this embodiment.
In elevation:

$$\Sigma erel(n,l) = \Sigma eraz(n,l) = \Sigma_{q=1}^{q=8} \Sigma eaz_q(n,l) \quad (24)$$

$$\Delta erel(n,l) = (\Delta eel_1(n,l) + \Delta eel_4(n,l) + \Delta eel_7(n,l)) - (\Delta eel_3(n,l) + \Delta eel_8(n,l) + \Delta eel_6(n,l)) \quad (25)$$

It is noted in this example that only six receivers are used in the vertical plane to produce the elevational delta channel, the receivers of the central row being unable to contribute to this embodiment.

This processing carries out a focusing in reception. The final result corresponds to the multiplication of the transmission/reception patterns.

Figure 14:
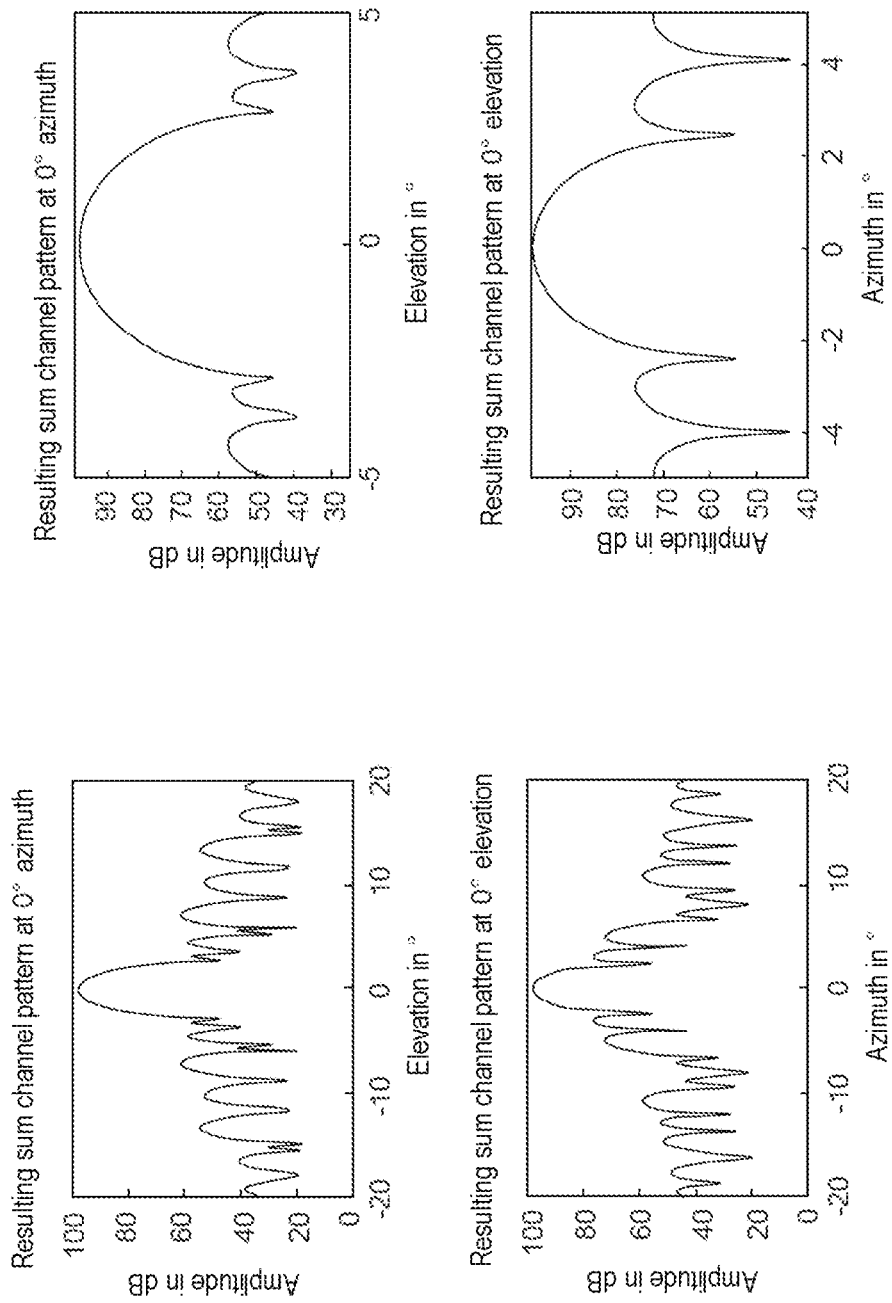
FIG. 14, the shapes of the sum channels of a first two-plane monopulse beamforming and of a second two-plane monopulse beamforming.
Figure 15:
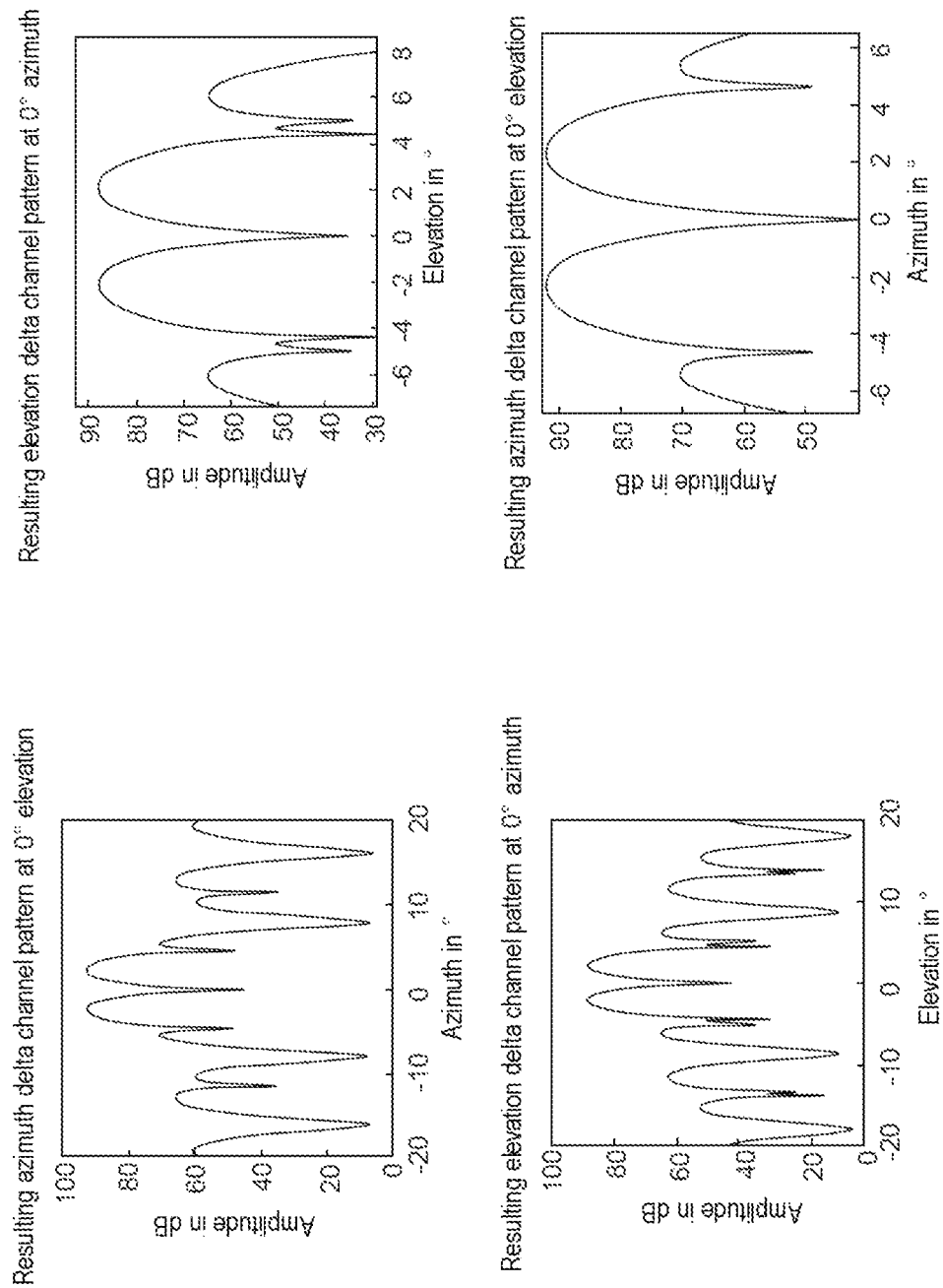
FIG. 15, the shapes of the two difference channels of a first two-plane monopulse beamforming and of a second two-plane monopulse beamforming.

FIGS. 14 and 15 represent the shape of the antenna patterns obtained after channel formation in transmission and in reception, corresponding to the exemplary antenna considered in FIG. 9, for the sum and difference channels, FIG. 14 illustrating the sum channel and FIG. 15 illustrating the two difference channels.

These patterns are obtained without amplitude weighting of the sub-arrays. According to need, the level of the sidelobes can further be reduced by applying such a weighting.

In a conventional manner the computed signals on output from the sum channel are used for the detection of the targets. The location of the targets is obtained by monopulse deviometry, on the basis of the sum and difference channels, for example by forming to within a scale factor:

$$discrepancyoaz(n, l) = sign(arg(\Delta eraz(n, l)) * arctg\left(\sqrt{\frac{\Delta eraz(n, l)}{\Sigma eraz(n, l)}}\right) \quad (26)$$

and $$discrepancyoel(n, l) = sign(arg(\Delta erel(n, l)) * arctg\left(\sqrt{\frac{\Delta erel(n, l)}{\Sigma erel(n, l)}}\right) \quad (27)$$

Figure 16:
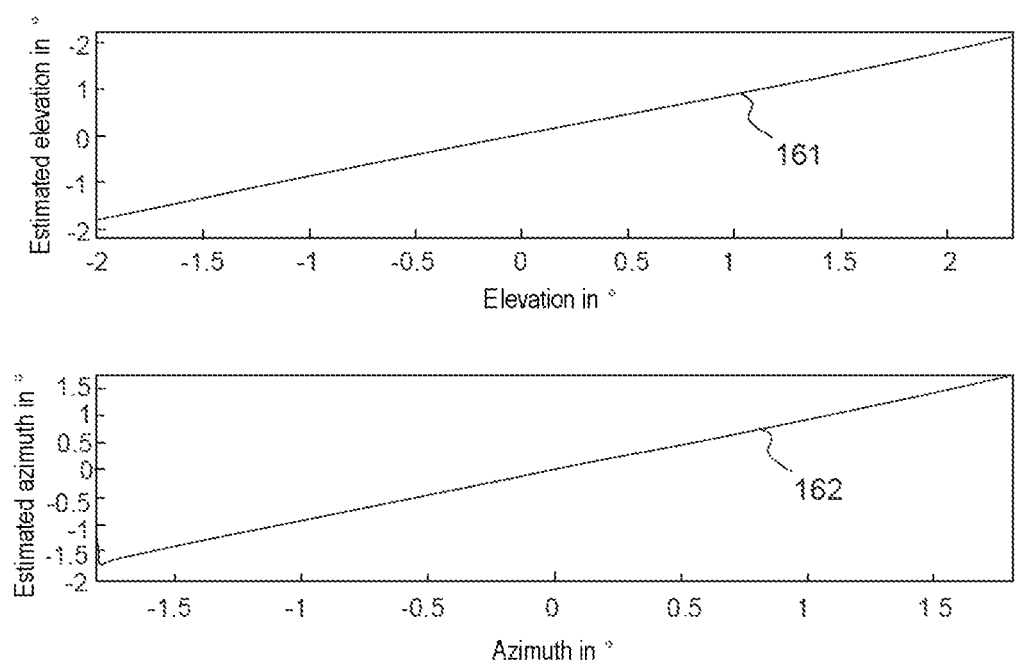
FIG. 16, deviometry lines obtained by utilizing the aforementioned sum and difference channels.

FIG. 16 presents the deviometry lines obtained by these processings, still for the antennal configuration of FIG. 9. The top curve 161 represents the elevational deviometry line. The bottom curve 162 represents the azimuthal deviometry line. The angles of azimuth and of elevation of the targets can thus be measured with the aid of these lines. Their slopes are sufficiently steep to allow precise measurements. Through these lines, the angle of elevation and the angle of azimuth are also measured independently.

The invention advantageously makes it possible to improve the resolution and the precision of angular location of the antenna for a given antennal surface area by virtue of the multiplication of the sum and difference patterns that are produced at one and the same time in transmission and in reception. The invention also comprises the advantages mentioned hereinafter.

The sidelobes and the ambiguous lobes are limited on account of the adjacency of the sub-arrays and of their uniform distribution.

The range budget is optimized by the radiating surface area of the antenna which is a maximum, and by the fact that transmission and reception are separated, thereby reducing the coupling, therefore the noise in reception.

The beamforming carried out in transmission is limited to four beams obtained by summation and by differencing, this not requiring significant computational resources.

The angular estimations obtained in azimuth and in elevation are obtained in independent ways and these estimations are mutually decorrelated.

The composite antenna patterns are symmetric in azimuth and in elevation, thereby guaranteeing homogeneous location and detection quality in the angular observation domain.

It is possible to form wide-field or narrow-field patterns simultaneously, so as to ensure for example short-range and long-range detection.

It is possible to adjust the level of the sidelobes by tailoring the amplitude of the signals on transmission or on reception on the various sub-arrays.

There is no switching device in the antenna, this being favourable to the range budget.

Finally, the processing is simple and easy to implement.

The invention has been presented for codings of the wave transmitted, in frequencies and in phases, carried out according to rows or columns, according to left and right parts, it is of course possible to carry out these codings according to other subsets of transmission and receive sub-arrays provided that the latter make it possible to discriminate antenna parts.

The invention claimed is:

1. A frequency-ramp-based frequency-modulation continuous-wave radar, termed FMCW, comprising at least one array antenna composed of transmit sub-arrays and of receive sub-arrays, a transmit and receive system and processing means, wherein:
   the distribution of the transmit sub-arrays and of the receive sub-arrays is symmetric both with respect to a vertical axis and with respect to a horizontal axis;
   at least two transmit sub-arrays symmetric with respect to the vertical axis are the largest possible distance apart;
   at least two transmit sub-arrays symmetric with respect to the horizontal axis are the largest possible distance apart;
   at least two receive sub-arrays symmetric with respect to the vertical axis are the largest possible distance apart;
   at least two receive sub-arrays symmetric with respect to the horizontal axis are the largest possible distance apart;
   a first coding of the wave transmitted by the transmit sub-arrays being carried out by frequency shifting of ramps between various transmit sub-arrays; and
   a second coding of the wave transmitted by the transmit sub-arrays being carried out by phase modulation from frequency ramp to frequency ramp between the various transmit sub-arrays.

2. The radar according to claim 1, wherein in the first coding, a first half of the transmit sub-arrays is fed by a first FMCW waveform and the second half is fed by the same waveform shifted in frequency, the two halves being symmetric with respect to the vertical axis.

3. The radar according to claim 1, wherein in the first coding, a first left half of the transmit sub-arrays is fed by a first FMCW waveform and the second left half is fed by the same waveform shifted in frequency, the two halves being symmetric with respect to the intersection of the vertical axis and of the horizontal axis.

4. The radar according to claim 1, wherein, in the second coding, the waves feeding the various transmit sub-arrays belonging to one and the same row, along the horizontal axis, are coded by the same phase code.

5. The radar according to claim 1, wherein, in the first coding, a first half of the transmit sub-arrays is fed by a first FMCW waveform and the second half is fed by the same waveform shifted in frequency, the two halves being symmetric with respect to the horizontal axis.

6. The radar according to claim 1, wherein, in the second coding, the waves feeding the various transmit sub-arrays belonging to one and the same column, along the vertical axis, are coded by the same phase code.

7. The radar according to claim 1, wherein the transmit and receive system comprises a first waveform generator generating a first FMCW waveform and a second waveform generator, synchronous and coherent with the first, generating the other FMCW waveform shifted in frequency.

8. The radar according to claim 7, wherein each of the waveform generators is used both for transmission and for synchronous demodulation of the signals in reception.

9. The radar according to claim 8, wherein the frequency discrepancy between the waveform generators is chosen so that the beat frequencies of the signals in reception demodulated by one and the same waveform generator occupy disjoint frequency bands depending on whether the signals in reception originate from a transmission arising from the same generator or from the other generator.

10. The radar according to claim 1, wherein the signals in reception resulting from the various transmit sub-arrays are separated by filtering and by correlation in reception, respectively according to their frequency band and according to their phase modulation code.

11. The radar according to claim 1, wherein a first two-plane monopulse beamforming comprising a sum channel and two receive channels is performed in transmission by the processing means, on each receive channel associated with a receive sub-array, by using the signals originating from all or some of the transmit sub-arrays.

12. The radar according to claim 11, wherein a second two-plane monopulse beamforming comprising a sum channel and two difference channels is performed in reception by the processing means, by associating all or some of the signals received on all or some of the receive channels.

13. The radar according to claim 11, wherein the detection and the angular location of targets are performed on the basis of the signals resulting from the product of the transmit monopulse beams and of the receive monopulse beams.

14. The radar according to claim 1, wherein the phase modulation code applied is a two-phase code having the value 0 or $\pi$.

15. The radar according to claim 1, wherein the phase modulation code applied is a Hadamard code.

16. The radar according to claim 1, wherein the antenna comprises six transmit sub-arrays and eight receive sub-arrays, the transmit and receive system comprising two integrated circuits each comprising a generator of the waveform, three transmit channels and four receive channels, the three transmit sub-arrays disposed on one side of one of the axes being fed by the transmit channels of one and the same integrated circuit, the other three sub-arrays being fed by the transmit channels of the other integrated circuit.

17. The radar according to claim 1, wherein it operates in millimetric waves.

18. The radar according to claim 1, wherein it is able to equip an automotive vehicle.

19. The radar according to claim 1, wherein a plurality of sets of the transmit sub-arrays interleave a plurality of sets of the receive sub-arrays such that the sets of the transmit sub-arrays, each of which comprising one or more transmit sub-arrays, alternate with the sets of the receive sub-arrays, each of which comprising one or more receive sub-arrays, and wherein the alternating is in both a first direction along the vertical axis and a second direction along the horizontal axis.

20. The radar according to claim 19, wherein each of the sets of the transmit sub-arrays is adjacent to at least one of the sets of the receive sub-arrays.

* * * * *